United States Patent [19]

Mirkovic

[11] Patent Number: 4,930,760
[45] Date of Patent: Jun. 5, 1990

[54] MULTIPLE CHUCKING FIXTURE

[76] Inventor: Zivorad Mirkovic, Marktgasse 3, CH-8212 Neuhausen am Rheinfall, Switzerland

[21] Appl. No.: 293,336

[22] Filed: Jan. 5, 1989

[30] Foreign Application Priority Data

Jan. 5, 1988 [CH] Switzerland .............................. 17/88

[51] Int. Cl.⁵ ................................................ B25B 1/00
[52] U.S. Cl. .................................... 269/99; 269/134; 269/137; 269/163; 269/256
[58] Field of Search ...................... 269/95, 97, 99, 134, 269/137, 138, 163, 164, 256, 906

[56] References Cited

U.S. PATENT DOCUMENTS

| 2,511,843 | 6/1950 | Graether | 269/256 |
| 2,662,433 | 12/1953 | Braun | 269/256 |
| 4,066,250 | 1/1978 | Campbell | 269/906 |
| 4,241,906 | 12/1980 | Cole | 269/99 |
| 4,341,375 | 7/1982 | Romanin | 269/906 |
| 4,445,678 | 5/1984 | George | 269/99 |
| 4,653,740 | 3/1987 | Meissner | 269/906 |

FOREIGN PATENT DOCUMENTS 1815274 10/1959 Fed. Rep. of Germany .
1983371 4/1968 Fed. Rep. of Germany .

Primary Examiner—Judy Hartman
Attorney, Agent, or Firm—Burns, Doane, Swecker & Mathis

[57] ABSTRACT

A multiple chucking device is disclosed, which is suitable in particular for clamping in grooves of a machine table. The device includes a clamping block, at least one clamping piece, and an end block which are mounted on a pair of guide axles. The clamping block is rigidly supported on the pair of guide axles, and the clamping pieces and the end piece are adjustable in a longitudinally displaceable manner, and may be secured by locking screws that engage the axles. The clamping piece and the end block are equipped with a clamping jaw in the form of a wedge collet, and with a support housing a recess, in which an obliquely downwardly extending tightening screw is located. The screw is tightened by the wedge collet so as to engage and clamp a workpiece. The clamping block, the clamping pieces, and the end block have clamping surfaces extending on both sides in the axial direction, so that the chucking unit may also be secured by clamping shackles acting on the clamping surfaces, with the aid of clamping elements and the T blocks sliding in the grooves of the table.

8 Claims, 4 Drawing Sheets

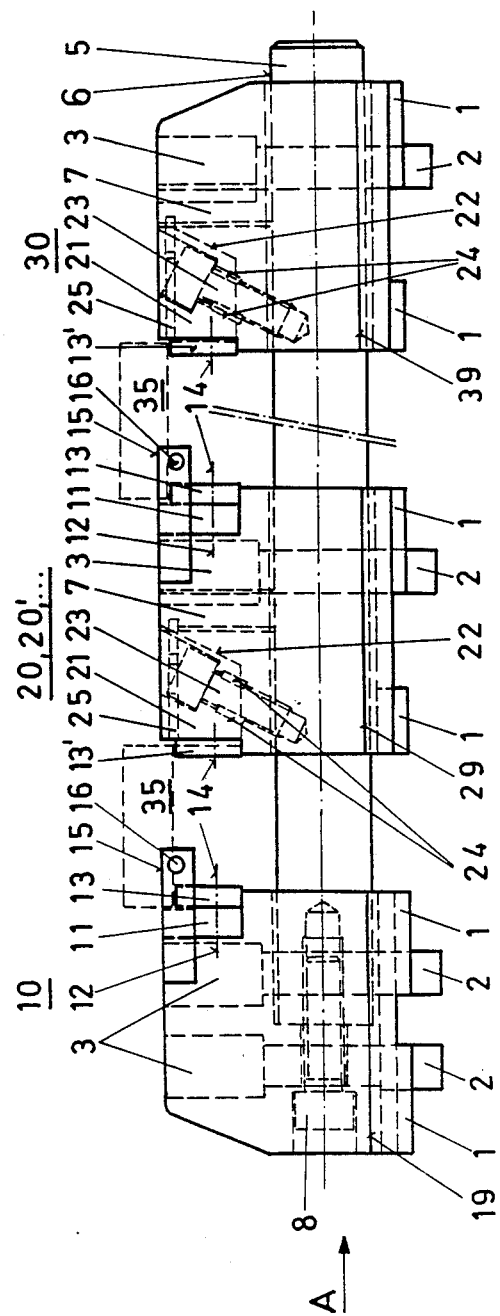
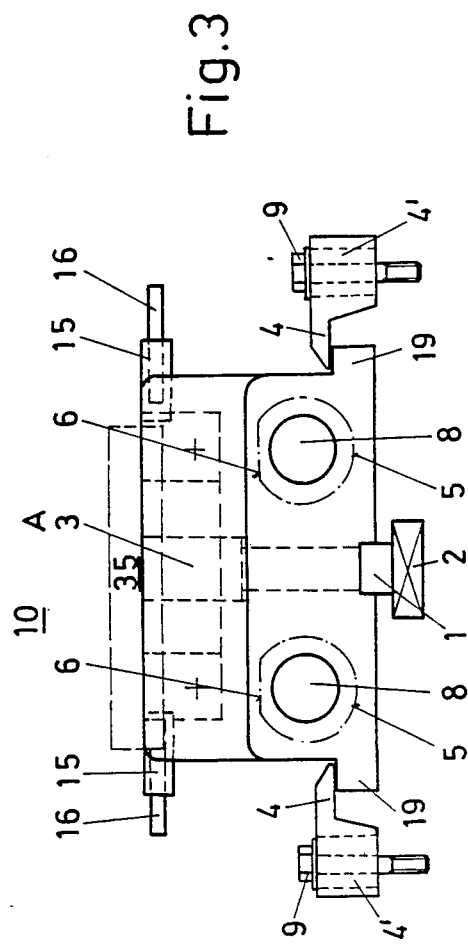

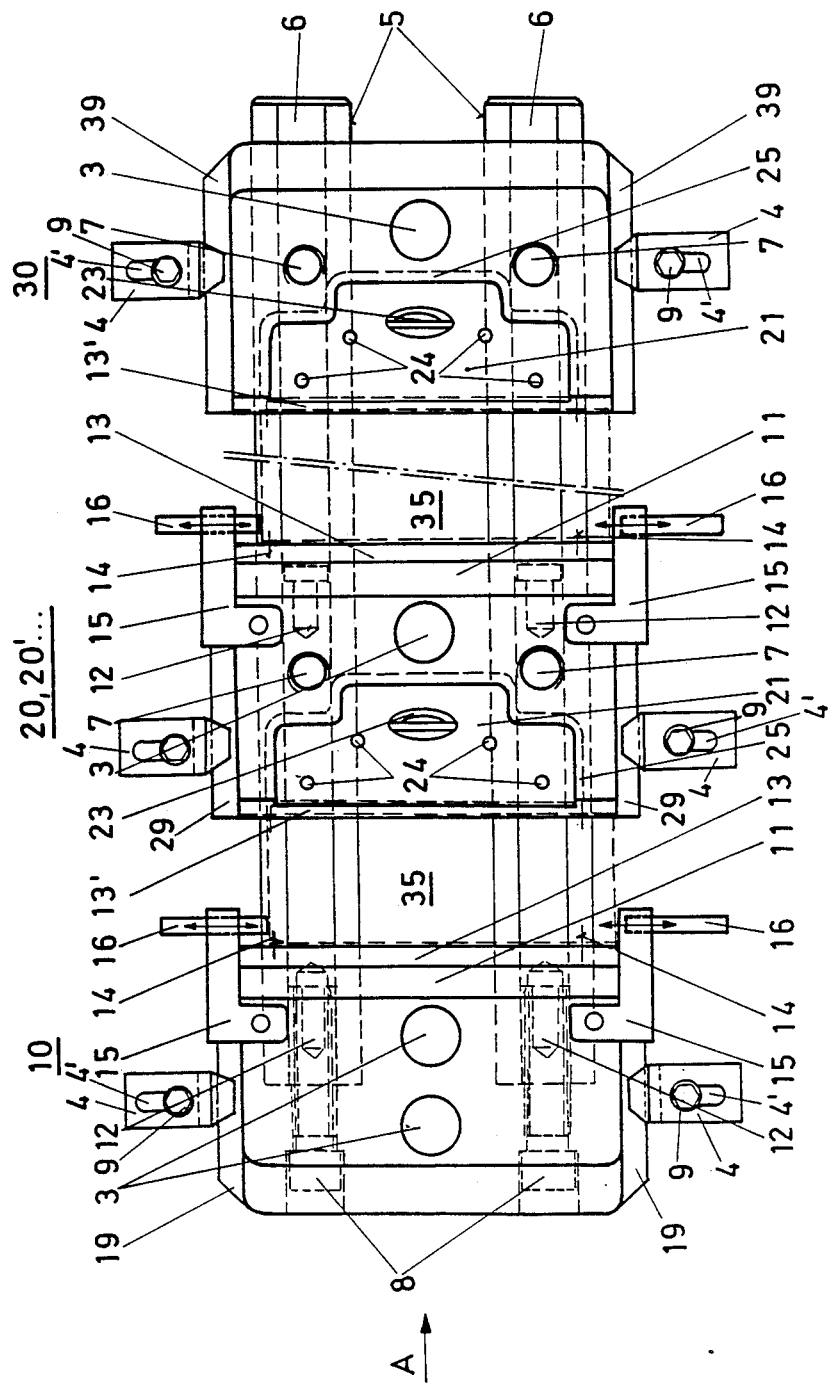

MULTIPLE CHUCKING FIXTURE

FIELD OF THE INVENTION

The present invention relates to workholders and more particularly to multiple chucking fixtures for machine tools.

BACKGROUND OF THE INVENTION

In machine tools, a variety of chucking means are used in the production of machine parts. For small and relatively simple workpieces, standard chucks are used, optionally in combination with special chucking jaws and various accessories. However, for the production of large pieces, such chucking means are less suitable.

For workpieces, which in view of their size and shape cannot be locked into the usual chucking fixtures, special expensive chucking means specifically adapted to the workpiece must be provided.

In machine tools, in particular in numerically controlled machines, for the direct or indirect chucking of workpieces, hold-down bolts are used, which hold-down bolts are inserted into T-shaped or dove-tailed grooves of the machine tables.

In the case of a variable chucking device for the holding of different workpieces according to Patent No. DE-GM 1 983 371, a workpiece may be clamped individually on both sides by chucking blocks, or two workpieces, in the form of double chucking, may be clamped between the chucking blocks. An intermediate piece is fixedly set into the T grooves of the base plate and is adjustable in height. A disadvantage of this arrangement is that the chucking device cannot be expanded to hold several workpieces.

From Patent No. DE-GM 1 815 274 a T-shaped grooved vise is known, in which sliding clamping jaw blocks and their pressure pieces are lined up on a tie rod located in the T groove of the table. One end of the tie rod is equipped with a guide head, while a threaded nut is located on the other end of the tie rod projecting from the T groove. The tightening of the nut displaces the pressure pieces and sliding blocks. By providing intermediate jaws and the sliding blocks, which are also drilled for the passage of the tie rod, several workpieces may be clamped in simultaneously. The clamping of the workpiece is highly time-consuming and very accurate clamping is only possible under certain conditions.

In the production of a large series of workpieces, to a certain extent specially shaped and adapted clamping means may be used on the machine table, so that, for example, three workpieces may be mounted simultaneously. A disadvantage is that such special clamping means require more space, together with long setup times. Furthermore, the loss of time while changing tools is unavoidable.

A common disadvantage of all of these clamping means is that the surface of the machine table usually cannot be utilized in an optimal manner.

OBJECTS AND SUMMARY OF THE INVENTION

It is, therefore, an object of the present invention to provide a chucking device suitable universally for the production of a large series of workpieces, and particularly for numerically controlled machine tools, without the disadvantages of the known devices. Special emphasis is placed on a highly accurate and rapid clamping of the workpieces for simultaneous processing, without special accessories and other auxiliary means, and whereby the optimal utilization of the surface of the machine table in the axial, radial and transverse directions is possible.

These objects are obtained in accordance with a preferred embodiment of this invention by a multiple chucking device that can be clamped in grooves of the machine table or machine tools. The chucking device includes a clamping block, one or more clamping pieces, and an end block, all of which are connected by a pair of guide axles. Each axle has an axial flattened support surface. Locking screws allow longitudinal adjustment of the clamping units and the end block relative to the guide axles. Each clamping unit and the end block has a clamping jaw in the form of a wedge collet and has a support with a recess to engage a workpiece. An obliquely extending locking screw may be tightened to move the wedge collet for adjusting the position of the clamping jaw.

An advantage of the invention consists in particular in the universal applicability of the multiple chucking device, which may be adapted, without any auxiliary means, to workpieces of different configurations and sizes.

A particular advantage is that on the pair of guide axles between the rigidly supported tightening block and the end piece several clamping pieces may be inserted, so that in the axial direction enough workpieces may be secured to fully utilize the entire available length of the machine table, while only the length of the guide axles must be varied. On the machine table, depending on the size and shape of the workpieces to be processed, additional clamping devices of the same type may be placed on the longitudinal direction, parallel to the first multiple chucking device, so that the surface of the table may be utilized in an optimal manner.

The simple and rapid clamping of the devices according to the invention significantly reduces the setup times and time losses associated with necessary tool changes.

In view of the fact that the clamping pieces and the end piece may be secured on the pair of guide axles in an adjustable manner and with an accuracy of 1/100 mm, and that each clamping piece is equipped on the front side with a rigidly mounted holding jaw for 0 point displacement and on the opposite side with a spring supported clamping jaw, the processing program set for the first workpiece may be used for all of the other workpieces clamped in, in an advantageous manner in the processing of similar workpieces on numerically controlled machines.

For the clamping of complex workpieces, at least two multiple chucking devices located parallel to each other and radially relative to the machine table, may be combined, without the need for the development and preparation of special clamping means.

Due to the fact that the components of the clamping unit have clamping surfaces on both sides, the unit may be clamped on the machine table by means of clamping shackles acting on the clamping surfaces in any position transverse to the machine table.

DESCRIPTION OF THE DRAWINGS

A preferred embodiment of the invention is illustrated in the drawings, in which:

FIG. 1 is a elevational view, partially in cross-section, of the multiple chucking device according to the invention;

FIG. 2 is a plan view of the chucking device according to FIG. 1;

FIG. 3 is a front elevational view of the chucking device according to the arrows A in FIGS. 1 and 2;

DETAILED DESCRIPTION

Figure 4:
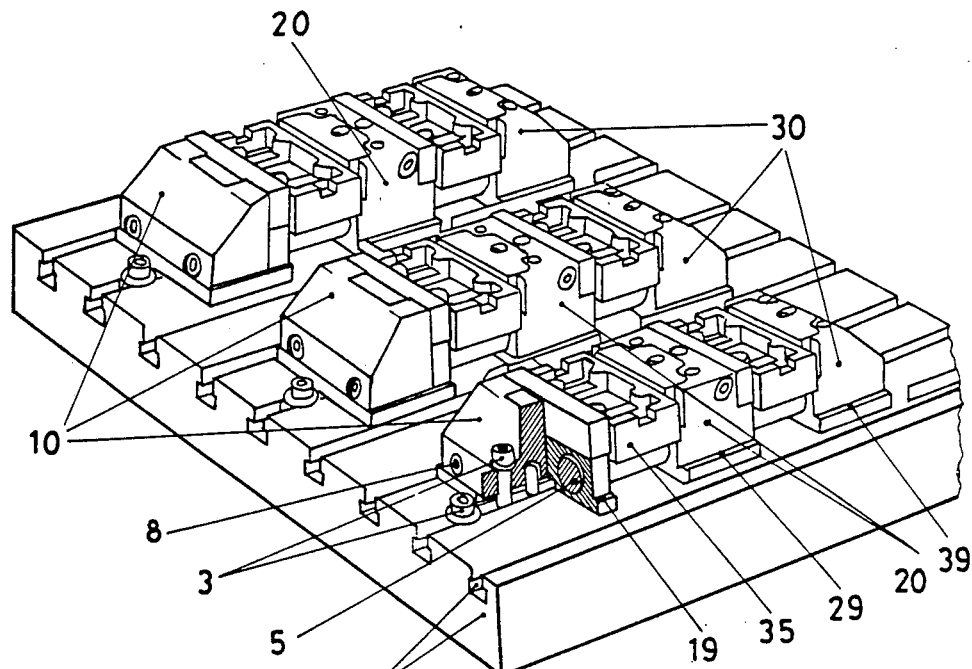
FIG. 4 and 5 are perspective view of three chucking units arranged parallel to each other.
Figure 5:
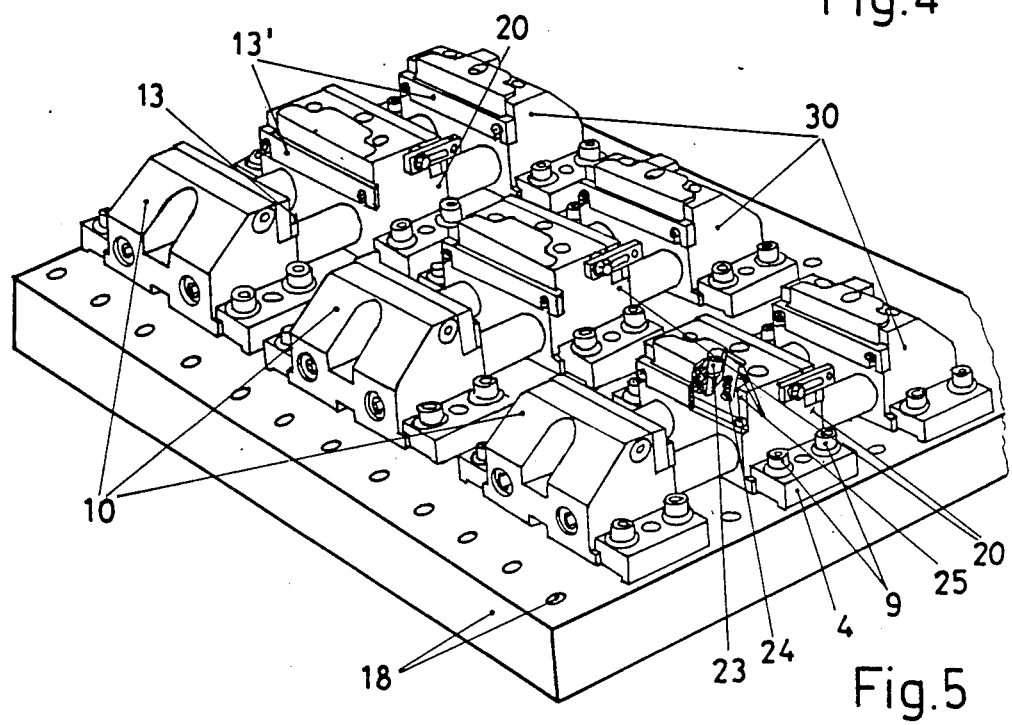
Figure 6:
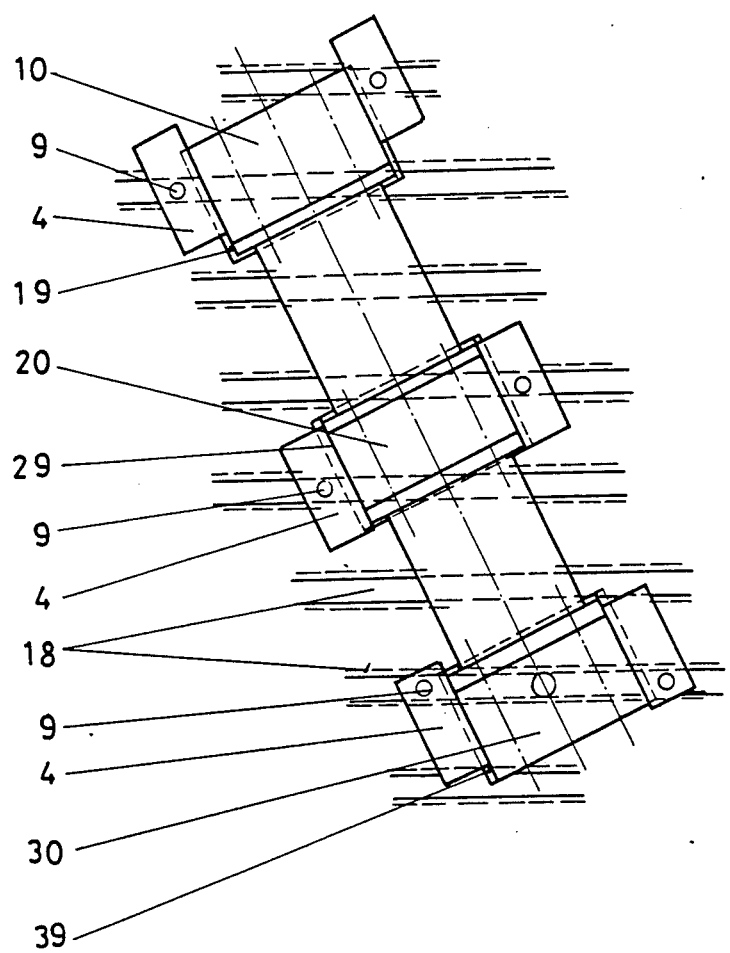
FIG. 6 is a plan view of a chucking unit mounted transversely on a machine table.

FIGS. 1, 2 and 3 show a preferred embodiment of the multiple chucking device which includes a clamping block 10, at least one clamping piece 20, 20', and an end piece 30, and which together with a pair of guide axles 5 forms a chuck unit. The clamping block 10 is stationarily supported on a machine table (not shown) and the interchangeable guide axles 5 are each held by a fastening screw 8. The clamping pieces 20, 20' and the end piece 30 may be adjusted by displacement in the longitudinal direction by means of the guide axles 5. The guide axles 5 are provided over their entire length on top with a flat-support surface 6. The clamping pieces 20, 20' and the end piece 30 may be secured by locking screws 7 acting on the flat parts 6 of the guide axles 5.

The guide axles 5 are replaceable with axles of different lengths, so that the chucking unit is universally applicable independently of the length of the machine table.

The clamping block 10, clamping piece 20, 20' and the end piece 30 are provided with sliding blocks 1 which are adapted to be received in grooves of the machine table and secured by means of the T slot blocks 2 and the locking screws 3 on the machine table. Thus, the clamping block 10 may be mounted by means of two locking screws 3, in order to insure the satisfactory holding of the workpieces 35.

On the inner side of the clamping block 10, a clamping jaw 11 is rigidly mounted on a support 13 for securing the workpiece 35. Each clamping piece 20, 20' is equipped axially on the front side relative to the clamping block 10 or the preceding clamping piece 20, 20', with a clamping jaw 21 in the form of a clamping plate with a wedge type collet 22 and with a support 13' containing a recess. The support 13' rests on four springs 24, preferably helical springs, and on the axial front side relative to the end piece 30, similar to the clamping block 10, connected with the support 13 by means of the holding jaw 11 rigidly mounted on it. The springs 24 of the clamping jaws 21 facilitate the accurate clamping and release of the finished workpiece 35.

The end piece 30 also has on the inner front side axially spaced relative to the last clamping piece 20, 20', a spring supported clamping jaw 21 with the support 13' containing a recess. The rigid holding jaws 11 are fastened by means of screws 12, indicated in FIG. 1 for the sake of clarity by screw axes only. On the clamping block 10 and the body of the clamping piece 20, 20', the supports 13 and 13' are secured on the holding jaw 11 or the clamping jaw 21 by screws 14, indicated as above.

The spring supported clamping jaws 21 may be clamped by means of locking screws 23 extending obliquely downward and by the wedge collet 22 movable axially relative to the guide axles 5 and against the workpiece 35. The clamping block 10 and the clamping pieces 20, 20' are provided on both sides of the pair of guides 5 with a stop holder 15 with radially adjustable stops 16, which preferably are in the form of pins and are serving to set the workpieces 35 in the lateral direction.

The clamping jaw 21 is in the form of a wedge-shaped clamping plate. Oil retainer scaling strips 25 are located between each clamping jaw 21 and the body of the clamping piece 20, 20' and the body of the end piece 30, respectively, so that the cleanliness of the chucking unit is assured even in operation.

By the variable length of the guide axles 5, the entire chucking unit may be adapted to the available length of the table of the machine tool. Depending on the size and shape of the workpiece 35 to be processed, additional multiple chucking units may be placed parallel to each other and radially relative to the machine table, so that the optimal use of the latter is always assured.

The clamping block 10, the middle clamping pieces 20, 20' and the end clamping piece 30 have configurations such that any oblique mounting relative to the machine table is possible, as each of said clamping pieces 10; 20, 20', and 30 have clamping surfaces 19, 29, 39, respectively, on both sides in the axial direction. By means of the clamping shackles 4 acting on the clamping surfaces 19, 29, 39, the chucking unit may be secured with the pair of clamping elements 9, for example threaded bolts extending through slots 4' of the clamping shackles 4, by the T blocks sliding the grooves of the machine table.

In FIGS. 1 to 3, both the locking screws 3 and the clamping elements 9 with the clamping shackles 4 are shown. Usually, every chucking unit would be secured either by means of locking screws 3 or clamping shackles 4 acting on the clamping surfaces 19, 29, 39, with T blocks 2 sliding in grooves of the table. However, in the case of special workpiece configurations, it is advantageous to secure the entire chucking unit in part by locking screws 3 and in part by clamping shackles 9, whereby the preparation of expensive special chucks is avoided.

While a preferred embodiment of this invention has been illustrated and described, it is recognized that variations and changes may be made therein without departing from the invention, as claimed.

What is claimed is:

1. A multiple chucking device for holding workpieces on a machine table, comprising:

a clamping block, a middle clamping piece, an end clamping piece, a pair of guide axles, each having an axial flattened support surface, said clamping block being rigidly supported on said pair of guide axles, said middle clamping piece and said end clamping piece being mounted on said guide axles and being adjustably secured at selected longitudinal locations relative to said axles, locking screws located in said middle clamping piece and end clamping piece for engaging each of said support surfaces to secure the middle clamping piece and the end clamping piece on said guide axles, wherein said pair of guide axles is replaceable, and are secured in the clamping block by removable fastening means, said middle clamping piece and the end clamping piece each having a clamping jaw mounted in a recess, an obliquely downwardly extending adjusting screw cooperating with each of said recesses and the clamping jaws to adjust a distance between the clamping jaw and the adjacent workpiece, the clamping block, said middle piece and the end clamping piece each having a pair of upwardly facing horizontal retention surfaces, whereby the clamping jaws may be adjusted to clamp a workpiece in the chucking device and the device may be temporarily secured to the machine table by the retention surface.

2. The multiple clamping device according to claim 1, wherein the clamping block has a holding jaw facing and each clamping jaw has a clamping plate mounted to the clamping jaw and supported by a spring.

3. The multiple chucking unit according to claim 1, wherein each clamping jaw includes a clamping plate, an oil retaining seal between the clamping plate and the respective clamping piece, and a plurality of springs.

4. The multiple chucking device according to claim 1, wherein the guide axles extend through the end clamping piece and the middle clamping piece and a stop holder is mounted on either side of the clamping pieces, together with a radially adjustable stop.

5. The multiple chucking device, according to claim 1, wherein each of the clamping block and the middle piece has a lateral stop holder and a lateral adjustable stop.

6. The multiple chucking device according to claim 1, including a plurality of middle clamping pieces mounted on said axles between said clamping block and said end clamping block.

7. The multiple chucking device according to claim 1, further including clamping shackles for engaging the retention surfaces to secure the clamping block, the middle clamping piece and the end clamping piece obliquely relative to the machine table.

8. The multiple chucking device according to claim 1 including vertically extending clamping screws in said clamping block, said middle clamping piece and said end clamping block for securing the device in grooves of the machine table, said clamping screws being provided with T blocks to be received in the grooves of the machine table.

* * * * *